July 5, 1932. J. F. SMITH 1,866,228
RAT TRAP
Filed Feb. 24, 1930 2 Sheets-Sheet 1
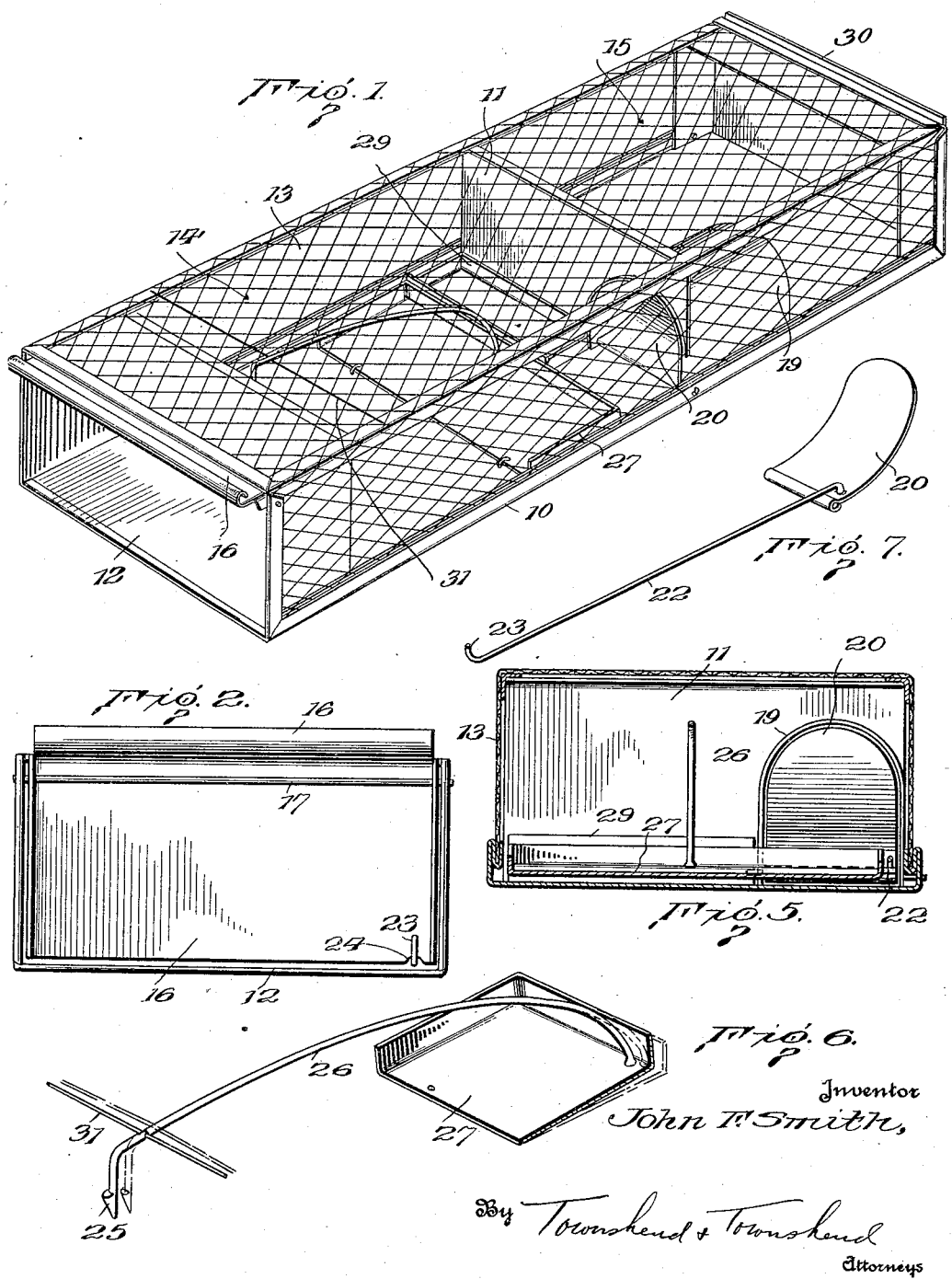

July 5, 1932.  J. F. SMITH  1,866,228
RAT TRAP
Filed Feb. 24, 1930  2 Sheets-Sheet 2
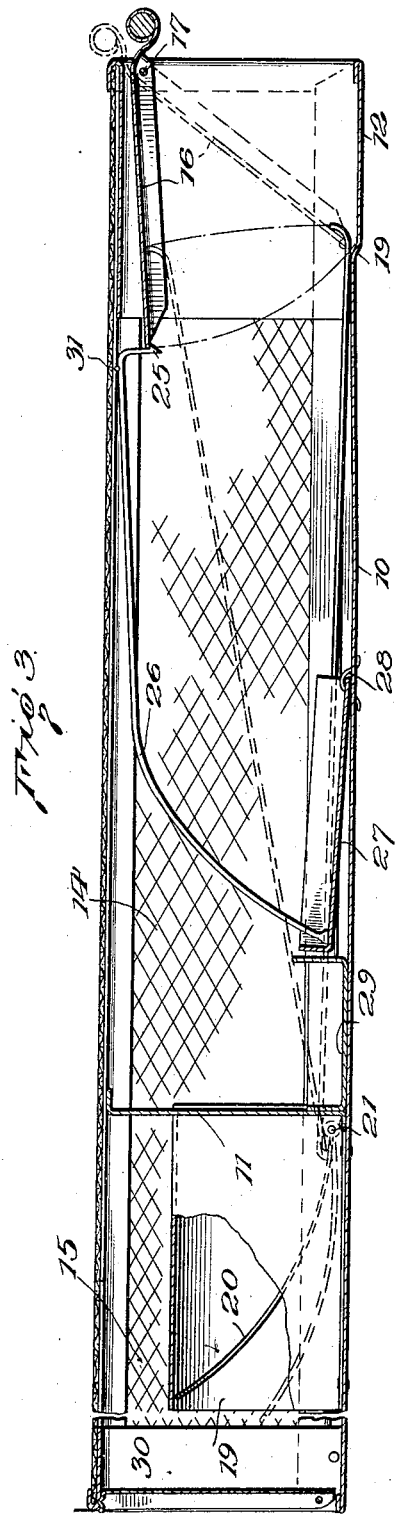
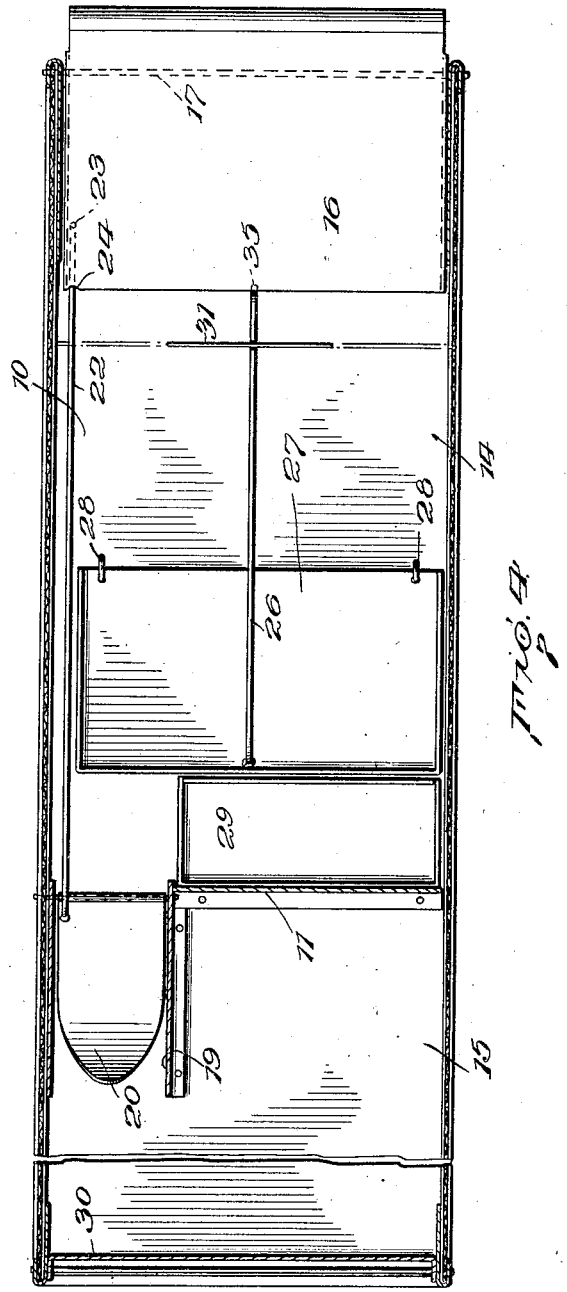
Inventor
John F. Smith,
By Townshend & Townshend
Attorneys Patented July 5, 1932

1,866,228

UNITED STATES PATENT OFFICE

JOHN F. SMITH, OF DUBLIN, GEORGIA

RAT TRAP

Application filed February 24, 1930. Serial No. 430,935.

This invention relates to traps for imprisoning rodents and like small animals, and in particular it is intended for use in trapping large rats of the kind known generally as dock or wharf rats. This application is a continuation in part of my prior application, Serial No. 420,141, filed January 11, 1930.

While it is comparatively an easy matter to catch mice and the smaller varieties of rats in practically any type of trap in general use, it is extremely difficult to catch large rats with such devices. These rats are unusually cautious, and if any type of trap is employed that grips or maims the animal, such device is effective only once, as the rats never again travel in the immediate vicinity.

The best results are obtainable through use of caging traps of the ever set or self setting types. However, in practically all of such traps, imprisonment of the animal is generally effected through a tilting and precipitating panel. While for mice and small rats such devices are practical, they are utterly ineffective against large rats for the reason that such rats, through strong back muscles, can maintain their bodies horizontally extended with forefeet raised. Consequently when such rats feel a slight movement or give beneath their forefeet, the animals instantly raise the same and back from the trap. Thus warned, they never return.

The present invention has been designed to circumvent this characteristic of large rats and to overcome those features of accepted trap construction which defeat the purposes of traps in dealing with the larger rodents.

Objects of the invention are: to provide a rat trap having trigger releasable means for imprisoning animals therein and having weight operated means actuated by an imprisoned animal for resetting the trigger releasable means; to provide in a trap of this character, a trigger controlled initial trapping compartment and a secondary trapping compartment having a runway communicating therewith, with means in the runway for resetting the initial compartment by passage of an animal through the runway; to provide in a trap of this character a relatively large unobstructed entrance; to provide a novel trigger mechanism; and generally to provide a novel and improved structural arrangement for carrying out the above noted objects.

With these and such other objects in view as will be apparent from the description, the invention resides in the novel construction, combination and arrangement of parts hereinafter described and claimed, and illustrated in the accompanying drawings wherein are shown certain physical embodiments of the principles of the invention.

Figure 1 is a perspective of a preferred form of trap, shown as in initially set position of the parts.

Figure 2 is an end elevation of the trap as sprung.

Figure 3 is a section longitudinally through the trap.

Figure 4 is substantially a top plan view with the top wall removed and parts shown in section.

Figure 5 is a transverse section through the trap.

Figure 6 is a detail view of the trigger means employed.

Figure 7 is a perspective of a resetting element.

In detail, the best construction which I have thus far devised, consists of a substantially rectangular base plate 10 having an upright transverse partition member 11 and an entrance end sill 12, the whole being constructed as an open metal frame which is covered at its top, sides and one end with a cage screening 13, forming an initial trap compartment 14 and a secondary trap compartment 15, the relative sizes of which may vary, the initial compartment being preferably of greater length than the compartment 15.

The open entrance end of the initial trapping compartment 14 is of the full width and height of the compartment, being closed in the sprung position of the trap as seen in dotted lines in Figure 3, by a door 16 hinged as at 17 to swing in a vertical plane with its lower inner end resting on the trap floor of the base 10. In this position the door 16, which is preferably formed of a metal plate to insure sufficient weight for a quick drop, is inclined inwardly of the trap thus preventing any possibility of its being pushed outwardly by a rat seeking escape.

If desired, the lowered end of the door may seat behind a transverse ridge 18 provided in the base 10 for the purpose, although this arrangement is not necessary.

At one side of the trap the partition 11 is apertured to receive one end of a runway 19 which extends into the secondary trap compartment 15. The floor of this runway consists of a tiltable platform 20 pivoted as at 21 at its forward end, to one side of which is rigidly attached a forwardly extending rod 22 having its free end 23 upturned and with the rod shank passed through a notch 24 in the bottom of the door 16. The weight of the rod 22 is such that by reason of the fulcrum 21 the runway platform 20 is normally tilted at an incline, as shown in Figure 3, sufficient to close the inner end of the runway 19.

In the open position of the door 16, as shown in full lines in Figure 3, it is retained in raised position substantially flat against the top of the trap by engagement of its inner edge with a depending latch 25 disposed beneath the top wall of the compartment 14 and formed by bending down the end of a light rod 26 having rigid connection at its other end with a trigger platform or plate 27 hinged at its forward edge to the trap floor as at 28. The rod 26 extends from the inner edge of the plate 27 and is curved to extend upwardly and lie beneath the top wall of the trap.

The trigger plate 27 is disposed just in advance of a bait holder 29, which may be formed in any suitable manner, preferably as a pan secured on the floor 16.

Adjacent the latch 25 the rod 26 is supported by connection with a taut wire 31 extending transversely across the top of the trap just beneath the top wall. The wire 31 has sufficient elasticity to insure the proper positioning of the latch 25 relative to the door edge. A preferred connection of rod 26 and wire 31 is shown in Figure 6.

In the operation of the trap, assuming it to be in set position as shown in Figures 1 and 3, when a rat enters the compartment 14 and advances toward bait placed in the pan 29, depressing movement will be imparted to the trigger plate 27 over which the animal must walk, sufficient to exert a releasing pull on the latch, by movement of the rod 26. Thereupon the door drops closed against the raised hook 23 on the rod 22. The trapped animal seeking escape ultimately enters the runway 19, in its fright not heeding the down movement of the platform beneath its weight. This movement of the platform 20, acting through the door set rod 22 elevates the inner edge of the door until it is caught and retained by the latch 25, thus resetting the trap.

The reset is not accomplished until the platform 20 is fully depressed, at which time the animal will leave the runway and enter the secondary compartment 15. In this compartment the animals remain until disposed of, as the weight of rod 22 returns the platform 20 to raised position when freed of the animal's weight. A door 30 is provided in a wall of the compartment 15 through which the bodies of the rats may be removed.

While in setting forth this invention I have illustrated and described certain details of structure and materials, I desire it to be understood that the invention is not to be limited thereto, but that any desired changes may be made in such details and materials as will fall within the scope of the invention as claimed.

I claim:

1. In an animal trap, a compartment provided with an entrance opening and an exit opening, a closure for said entrance opening and biased to closing movement, a latch normally holding said closure in open position, a depressible trigger in said compartment, a rod operatively connecting said latch and trigger, and elastic means supporting said rod from the top of said compartment.

2. In an animal trap, a compartment having an entrance opening and an exit opening, a closure for said entrance opening and biased to closing movement, a depressible trigger in said compartment, a latch normally holding said closure in open position and comprising a rod connected at one end to said depressible trigger, and elastic means supporting said rod in said compartment, said elastic means acting to return said trigger to elevated position after depression thereof.

In testimony whereof I affix my signature.

JOHN F. SMITH.